Oct. 21, 1958  R. N. STEELE  2,856,785
BRACKET FOR MOUNTING AN AUXILIARY GENERATOR ON
THE REGULAR GENERATOR OF AN ENGINE
Filed Oct. 1, 1954  2 Sheets–Sheet 1

INVENTOR.
RAY N. STEELE
BY
Merrill M. Blackburn
ATTORNEY

Oct. 21, 1958 R. N. STEELE 2,856,785
BRACKET FOR MOUNTING AN AUXILIARY GENERATOR ON
THE REGULAR GENERATOR OF AN ENGINE
Filed Oct. 1, 1954 2 Sheets-Sheet 2

INVENTOR.
RAY N. STEELE
BY
Merrill M. Blackburn
ATTORNEY

United States Patent Office 2,856,785
Patented Oct. 21, 1958

2,856,785

BRACKET FOR MOUNTING AN AUXILIARY GENERATOR ON THE REGULAR GENERATOR OF AN ENGINE

Ray N. Steele, Cedar Rapids, Iowa

Application October 1, 1954, Serial No. 459,649

10 Claims. (Cl. 74—242.8)

This invention relates to the mounting of an auxiliary generator on an engine and especially under the hood of a motor vehicle, to supply current for operating lights and various power tools and for emergency stand-by use in case of a power failure.

Because of the important part which electricity plays in modern life and to make 110 volt current readily available beyond the limits of power lines, or anywhere, in the event of a power failure, it has become very desirable to be able to use the convenience and mobility of the engine of a motor vehicle to generate current for such use.

Since the space available under the hood of the engine is very limited for mounting an auxiliary generator of sufficient capacity to operate several electric motors at once, and since there is such a great variation in the size and position of parts and accessories of the engines, necessitating a large variety of brackets and, consequently, extensive tooling costs, it has been found to be most practical to use the space over the side-mounted regular generator and rest the bracket on its outside surface. The bracket is secured in position and the auxiliary generator is pivoted to an adjustable member, which is bolted to the bracket. The size and drive of the regular generator are well standardized and, for this reason, the bracket and drive for the auxiliary generator are also standard within practical limits.

An auxiliary generator of large capacity is necessarily heavy and, where it is carried by a bracket which is, in turn, fastened to the regular generator, there is serious danger of overloading the mounting bracket of the regular generator, which was designed to carry only the load of the small, comparatively light, regular generator. To avoid thus overloading the regular generator and to assure a safe, positive support of the bracket of the auxiliary generator directly on the engine, an adjustable stabilizer is used. This stabilizer will be described in detail hereinafter.

This mounting is satisfactory for most engines. An exception is in the case of some V type engines, where the regular generator is mounted directly over the center of the engine, between the cylinder heads. There may not be sufficient room under the hood to mount the auxiliary generator on top of the regular generator. However, it may usually be mounted directly on one cylinder head and driven from the shaft of the water pump. In such cases, the bracket may be standardized and adapted to the bolts of the cylinder head or to other main bolts of the engine, by use of the adjustable, slotted shoes, as shown.

Among the principal objects of this invention is the provision of convenient means for removing the drive belt so that the auxiliary generator will not be kept running when no current is wanted. This is accomplished by the use of a lever-operated control, by which the auxiliary generator is moved on its pivot closer to the driving pulley, so that the drive belt may be instantly installed or removed. This control also locks the auxiliary generator in the operating and non-operating positions.

Although my invention resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 1:
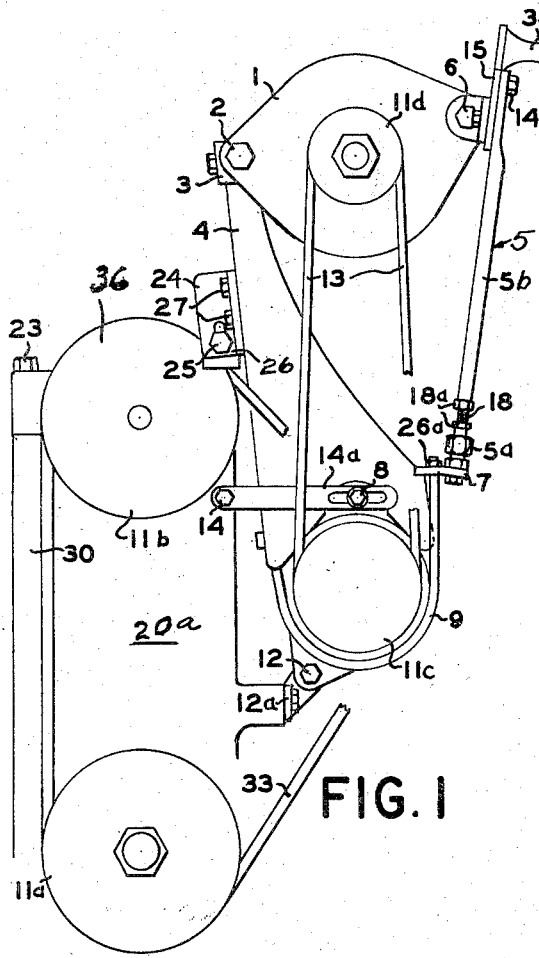
Fig. 1 is a front elevational view of an engine with an auxiliary generator mounted thereon.

Reference will now be made in greater detail to the annexed drawings for a more complete description of this invention. In Fig. 1 is shown an appliance in the form of auxiliary generator 1 attached, by means of a pivot screw 2, to an adjustable pivot bar 3 which is, in turn, bolted to a support or bracket 4 with a plurality of bolts. On the opposite side of the auxiliary generator 1, a control assembly 5 including the link 5b is attached to the auxiliary generator 1 by a control pivot screw 6. The control assembly 5, at its lower end, has a ball-and-socket joint which is attached to a control bar 7, which is, in turn, fastened, by generator-embracing means such as U-bolts 9, to the bracket 4. The base or lower portion of the bracket 4, which, in cross-section, resembles a deep channel, is notched in the form of an inverted V and rests on the round, outside surface of the regular generator 10.

The purpose of the control assembly 5 including the link 5b is to move the auxiliary generator 1 so that the drive belt 13 can be instantly installed or removed. This is done by rotating handle 34 to a reverse position so that pivot 14c is above pivot 14b, shortening the distance between pulley 11d and pulley 11c. With this distance shortened, the drive belt 13 can be removed from the pulleys 11c and 11d, and there will no longer be any drive belt for the auxiliary generator.

Figure 2:
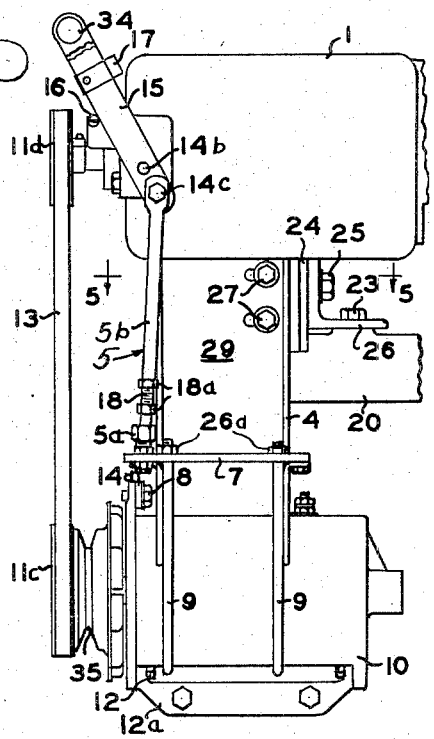
Fig. 2 is a side elevational view of the same.
Figure 4:
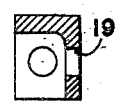
Fig. 4 represents a cross-sectional view of the adjustable pivot member, taken along the plane indicated by the line 4—4 in Fig. 3.

The drive belt 13 can be instantly installed and removed. This belt is removed by rotating control lever 15 on the pivot 14b which causes the auxiliary generator 1 to move closer to or farther away from the regular generator 10. In the operating position, as shown in Fig. 2, the control lever 15 goes over the center, against a stop-screw 16. This locks the auxiliary generator 1 in operating position. When the control lever 15 is rotated to its lowest position in the opposite direction, a spring-locking clip 17 engages the control link 5b, locking the auxiliary generator 1 in the idle position, thus preventing rattling. The control lever 15 is turned by the handle 34. The drive belt 13 may be removed from the auxiliary generator 1 by turning the control lever 15 down, so that the auxiliary generator 1 is lower and the drive belt 13 is loosened. Then it can be removed from the pulley 11d and the pulley 11c.

To adjust the tension of the drive belt 13, it is necessary only to tighten or loosen an adjusting screw 18, which, having a ball-end, will turn in its socket. This moves the auxiliary generator 1 up or down. The adjusting screw 18 is locked in place by lock nuts 18a.

Figure 3:
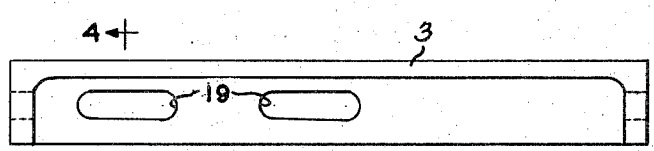
Fig. 3 is a side view of an adjustable pivot member, shown in Fig. 1.
Figure 5:
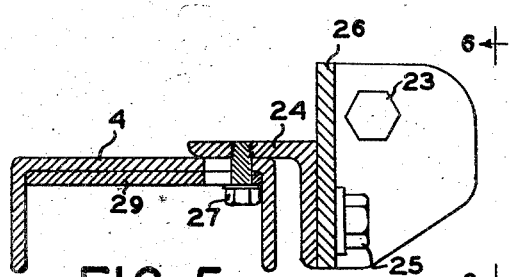
Fig. 5 represents a cross-sectional view of an adjustable stabilizer and bracket, taken along the plane indicated by the line 5—5 in Fig. 2.
Figure 6:
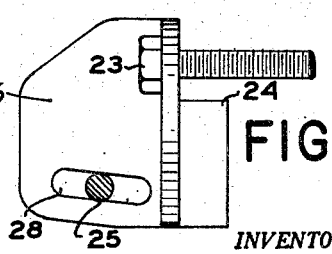
Fig. 6 is a view of the adjustable stabilizer, taken in the direction of the arrows 6—6 in Fig. 5.

Because the position of the pulley 11c of the regular generator 10 will vary with respect to the position of the bracket 4, provision has been made for adjusting the auxiliary generator 1 endwise on the bracket 4 by using slotted mounting holes 19, shown in Fig. 3. The control bar 7 is also slotted, permitting movement of the ball-and-socket end 5a of the control assembly 5 to cooperate in any endwise movement of the auxiliary generator 1.

To prevent failure of the mounting bracket 12a on the regular generator, due to stresses of weight and vibration in carrying the auxiliary generator 1 and the bracket 4, an adjustable stabilizer 26 is provided. This adjustable stabilizer 26 is shown in Figs. 1, 2, 5, and 6. It consists of two angle members or brackets, one, 24, bolted to the bracket 4 by means of bolts 27, and the other, 26, bolted to the engine head 20 by means of the bolt 23 of the cylinder head. These angle members 24 and 26 are bolted together with a large bolt 25, passing through the slot 28. This assembly must be adjustable because of the variation in the location of the regular generator 10 with respect to the engine, and especially so, because it is necessary to move the regular generator 10 to adjust the tension of the fan belt 33.

To adjust the tension of the fan belt 33, lock screw 8 is loosened and the regular generator 10 is rotated on the pivot bolt 12 toward or away from engine block 20a until the desired tension is obtained. Then the lock screw 8 is tightened, which locks the regular generator 10 in position. When the regular generator 10 is moved to adjust the tension of the fan belt 33, the bracket 4 will, of course, move with it, and stabilizer locking bolt 25 and U-bolt nuts 26a must be loosened to make it possible to move the regular generator 10. Since the motion of the regular generator 10 is rotary on the mounting bracket 12a, the bracket 4 will move up and down as well as rotating slightly with respect to the cylinder head 20 during which time the U-bolts 9 are temporarily loosened. Slot 28 in the adjustable stabilizer 26 provides for this motion, permitting the bracket 4 to rock, as well as to move endwise on the stabilizer locking bolt 25. The adjustable stabilizer 26 is secured to the bracket 4 by the locking bolts 27 and is movable transversely thereof. The large bolt 25 and the nuts 26a of the U-bolts 9 must all be tight. This provides a positive support for the bracket 4 with its auxiliary generator 1 directly on the engine and prevents any over-loading of the mounting bracket 12a of the regular generator. A reinforcing plate 29 for the bracket 4 is attached to the inside of the bracket by the locking bolts 27.

As previously stated, in some V type engines, there is insufficient room under the engine hood to mount an auxiliary generator on top of the regular generator. In such cases, it can usually be mounted directly on the cylinder head and driven from a water pump shaft, but here the major problem arises from the great variation in the position of the bolts of the cylinder head and other main bolts of the engine, and, also, to clearances required for projecting parts. In order to use one standard bracket and thus avoid expensive tooling costs, a slotted shoe assembly is used to adapt and secure this bracket to the main bolts of the engine. Such an installation is shown in Fig. 7, with the adjustable shoe shown in detail in Figs. 8, 9, and 10.

The fan belt 33, driven by the crank shaft pulley 11a, drives pulley 11c, which, in turn, drives the pulley on the shaft of the auxiliary generator.

Figure 7:
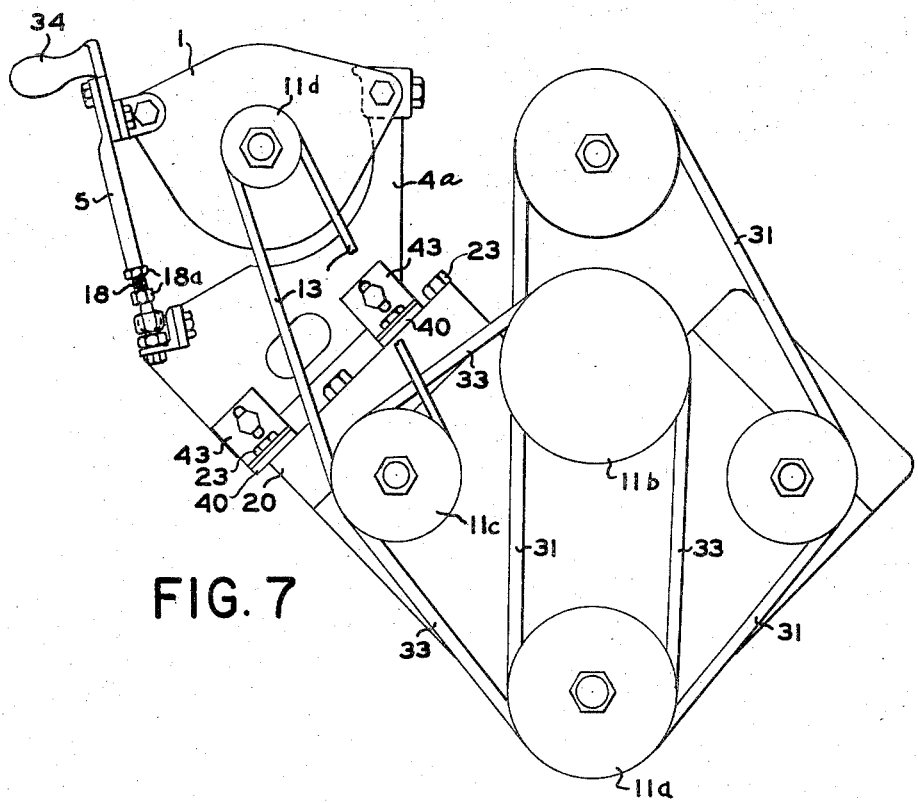
Fig. 7 is a front elevational view of a V type engine with an auxiliary generator attached thereto.

In Fig. 7, the bracket 4a is the same as the one shown in Figs. 1 and 2 as 4, except that the one in Fig. 7 is mounted directly on the cylinder head 20, while in Figs. 1 and 2, the bracket 4 is bolted to the regular generator 10.

Figure 8:
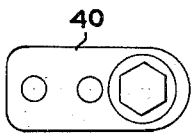
Fig. 8 is a plan view of the engine bar member, shown in section in Fig. 9 and in front elevation in Fig. 10.
Figures 9, 10:
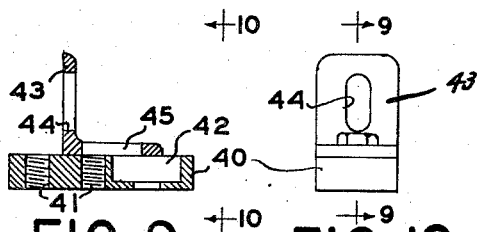
Fig. 9 represents a cross-sectional view of an adjustable shoe assembly taken in the direction of the arrows 9—9 in Fig. 10.
Fig. 10 is a front view of the adjustable shoe assembly taken in the direction of the arrows 10—10 in Fig. 9.

The adjustable shoe assembly 40, shown in Figs. 8, 9, and 10, is bolted to the engine with the bolt 23 of the cylinder head and has its head in a counter-bore recess 42 which is deep enough so that the head is below flush. This permits the angle member 43 of the adjustable shoe assembly to assume any position, when bolted on the engine bar member 40, using either of the tapped holes 41 with the slotted hole 45. The angle member 43 is bolted to the bracket 4a, as shown in Fig. 7, using the slotted holes 44. The combined range of vertical and horizontal movement possible when using four of these adjustable shoes permits one standard bracket to be used on a number of different engines with a resulting saving of tools and parts.

It is of course understood that the specific description of structure set forth above may be deviated from without departing from the spirit of this invention as disclosed in this specification and as defined by the appended claims.

Having now described my invention, I claim:

1. For use in an automotive vehicle having an internal-combustion engine including a generator having a fore-and-aft drive shaft and pivotally mounted alongside the engine at a level below the engine head for lateral adjustment tending to vary the level of the generator relative to the head: an accessory and mounting therefor comprising a generally upright support positionable at the same side of the engine as the generator and having a lower portion proximate to the generator and an upper portion proximate to the head; means on said lower portion embracing the generator to mount the support, said means being adjustable to enable lateral swinging of the support about the generator axis; a bracket for rigid attachment to the head; a stabilizer secured to the support upper portion adjacent to the bracket; means interconnecting the stabilizer and bracket and including provision for vertical movement of the stabilizer and support as the level of the generator varies with adjustment thereof; a drivable appliance carried by the support upper portion independently of the engine and including a drivable fore-and-aft shaft; and drive means interconnecting the appliance and generator shafts.

2. The invention defined in claim 1, in which: the appliance is carried on the support for vertical adjustment relative to the support so as to be movable selectively toward and away from the generator independently of adjustment of the generator relative to the engine; the drive means includes an endless belt between the appliance and generator shafts; and means is operatively connected between the appliance and the support for moving the appliance selectively toward and away from the generator to respectively loosen and tighten the belt.

3. The invention defined in claim 1, in which: the generator-embracing means includes an inverted V part on the support lower portion and engaging the top of the generator and U-bolt means engaging the generator from below and connected to the legs of the inverted V part.

4. The invention defined in claim 1, in which the generator-embracing means is adjustable fore-and-aft on the generator and the stabilizer is fore-and-aft adjustable on the support to enable fore-and-aft shifting of the support and appliance relative to the engine and generator.

5. For use in an automotive vehicle having an internal-combustion engine including a generator having a fore-and-aft drive shaft and mounted alongside the engine at a level below the engine head: an accessory and mounting therefor comprising a generally upright support positionable at the same side of the engine as the generator and having a lower portion proximate to the generator and an upper portion proximate to the head; means on said lower portion engaging the generator to mount the support; means on the support upper portion adjacent to and engaging the head to additionally mount the support; a drivable appliance carried by the support upper portion independently of the engine and including a drivable fore-and-aft shaft; and drive means interconnecting the appliance and generator shafts.

6. The invention defined in claim 5, in which: the appliance is carried on the support for vertical adjustment relative to the support so as to be movable selectively toward and away from the generator; the drive means includes an endless belt between the appliance and generator shafts; and means is operatively connected between the appliance and the support for moving the appliance selectively toward and away from the generator to respectively loosen and tighten the belt.

7. The invention defined in claim 5, in which: the generator-engaging means includes an inverted V part on the support lower portion and engaging the top of the generator and U-bolt means engaging the generator from below and connected to the legs of the inverted V-part.

8. For use in an automotive vehicle having an internal combustion engine including a generator having a fore-and-aft drive shaft and pivotally mounted on the engine for lateral adjustment relative to the engine; an accessory and mounting therefor, comprising: a support positionable at the same side of the engine as the generator and having a first portion proximate to the generator and a second portion proximate to the engine head; means embracing the generator and connected to the support first portion and enabling adjustment of the support relative to the generator about the axis of the generator; means on the support second portion and engaging the head to additionally mount the support and including provision for movement of the support relative to the head when the support is adjusted relative to the generator; a drivable appliance mounted on the support and including a drivable shaft; and drive means interconnecting the generator and appliance shafts.

9. The invention defined in claim 8, including: means mounting the appliance on the support for movement selectively toward and away from the generator; said drive means comprises a drive belt and said mounting means enabling removal of the belt upon movement of the appliance toward the generator; control means interconnected between the appliance and the support for holding the appliance away from the generator with the belt tight and operative to shift the appliance toward the generator to enable removal of the belt; and said control means including a locking device operative to lock said control means when holding the appliance away from the generator.

10. The invention defined in claim 9, including: means incorporated in the control means and operative independent of the appliance-shifting function thereof for selectively adjusting the appliance relative to the generator to tighten and loosen the drive belt.

References Cited in the file of this patent
UNITED STATES PATENTS

| | | |
|---|---|---|
| 1,196,927 | Brush | Sept. 5, 1916 |
| 1,242,596 | Richards | Oct. 9, 1917 |
| 1,273,170 | Fisher | July 23, 1918 |
| 2,264,553 | Robinson | Dec. 2, 1941 |
| 2,402,859 | Webber | June 25, 1946 |
| 2,509,458 | Smith | May 30, 1950 |